United States Patent Office 3,639,333
Patented Feb. 1, 1972

3,639,333
ALIPHATIC AMIDES AS LIGHT STABILIZERS
FOR PIGMENTED POLYMERS
William Frederick Baitinger, Jr., Belle Mead, N.J., assignor to American Cyanamid Company, Stamford, Conn.
No Drawing. Filed Aug. 17, 1965, Ser. No. 480,468
Int. Cl. C08f 45/04, 45/60
U.S. Cl. 260—41 B
8 Claims

ABSTRACT OF THE DISCLOSURE

A polymeric composition comprising:
(1) a polymer selected from the class consisting of poly(vinyl chloride), polystyrene and polyolefins having 2–4 carbon atoms and
(2) at least 0.5% of titanium dioxide based on the weight of the polymer and
(3) an amide of the formula:

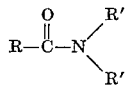

wherein R is alkyl ($C_1$–$C_{18}$), alkenyl ($C_2$–$C_{18}$), carboxyalkyl ($C_1$–$C_{18}$), carb(lower alkoxy)alkyl ($C_1$–$C_{18}$), $(R')_2N$—$(CH_2)_n$, $(R')_2NCO(CH_2)_n$ or $R'CON(R')CH_2$—$(CH_2)_n$; R' is hydrogen, alkyl ($C_1$–$C_{18}$), hydroxy(lower alkyl), lower alkoxy(lower alkyl) or cyano(lower alkyl); and $n$ is zero to eighteen inclusive, said amide being present in a concentration of 0.1–10.0% of the weight of the polymer. These compositions have improved light stability and can be formed into shaped articles as for example by molding, extrusion, or spinning.

This invention relates to an improved means for stabilizing pigmented polymers against deterioration by light. More particularly, it relates to the provision of $TiO_2$-pigmented polymers stabilized with certain aliphatic amides against light deterioration.

A variety of materials has been used for stabilizing polymers against discoloration by light. Ultraviolet absorbers have been found to improve light stability to varying degrees. Certain substrates are more successfully treated with U.V. absorbers than others. For example, plasticized polymeric compositions respond to certain stabilizers more favorably than do the same polymers in unplasticized compositions; but unplasticized polymers may be stabilized by a combination of U.V. absorbers with certain non-absorbing compounds. In some cases, U.V. absorbers may actually accelerate deterioration of the polymer. This is the case where a U.V. absorber per se is added to $TiO_2$-pigmented polymers such as rigid PVC. Thus, while there presently exists a wide array of light stabilizers, there are, nevertheless, many polymeric compositions, for example, pigmented polymers, for which adequate light stabilizing systems have not yet been provided. It is the object of the present invention to provide a new light stabilizer for $TiO_2$-pigmented polymers.

The present invention is based on the discovery that a class of compounds which are not per se light stabilizers, act as light stabilizers for polymeric compositions which have been pigmented with titanium dioxide. The particular compounds are amides represented by the following Formula I:

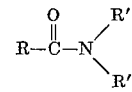

wherein R is alkyl ($C_1$–$C_{18}$), alkenyl ($C_2$–$C_{18}$), carboxyalkyl ($C_1$–$C_{18}$), carb(lower alkoxy)alkyl ($C_1$–$C_{18}$), $(R')_2N$—$(CH_2)_n$—, $(R')_2NCO(CH_2)_n$— or $R'CON(R')CH_2$—$(CH_2)_n$—; R' is hydrogen, alkyl ($C_1$–$C_{18}$), hydroxy(lower alkyl), lower alkoxy(lower alkyl) or cyano(lower alkyl); and $n$ is zero to eighteen inclusive.

Examples of compounds which may be used are the following:
(1) Alkanamides and N-substituted alkanamides such as myristamide, stearamide, caproamide, lauramide, N,N-dimethyllauramide, N,N-dimethylstearamide, N-(2-dodecyl)-stearamide, N-(2-hydroxyethyl)myristamide, N-octadecyllauramide and N,N-bis(2-hydroxyethyl)lauramide;
(2) Alkenamides and N-substituted alkenamides such as acrylamide, methacrylamide, linoleamide, oleamide, N-2-dodecylacrylamide, N,N-dimethyloleamide, N-dodecyl-linoleamide and N-methylmethacrylamide;
(3) Carboxyalkylcarboxamides (including carbalkoxyalkyl carboxamides) and N-substituted derivatives such as succinamic acid, N,N-diethyl succinamic acid, N,N-diethyl succinamic acid butyl ester, N,N-bis-2-cyanoethyl succinamic acid and N,N-bis-2-hydroxyethyl adipic acid monoamide;
(4) Aminoalkylcarboxamides and N-substituted products thereof such as 3-dimethylaminopropionamide and N-octadecyl 3-dimethylaminopropionamide; and
(5) Bis-amides such as N,N-bis(ethoxymethyl)hexanediamide and N,N,N',N' - tetrakis(cyanoethyl)succinamide.

The results obtained with the present invention are most surprising since the amides alone in unpigmented polymers are not effective as light stabilizers. While titanium dioxide alone increases the light stability of various polymeric compositions, it was not expected that the addition of an amide of the type herein disclosed which is ineffective in the unpigmented polymer, should result in vastly improved light stability of the pigmented polymeric compositions.

To improve the light stability of pigmented polymers, it would normally be expected that known ultraviolet absorbers could be used.

It is now found that ultraviolet absorbers can be dispensed with in the case of pigmented polymers and that the amides of the present invention, in spite of their ineffectiveness in unpigmented polymeric compositions, are new, useful and economical light stabilizers therefor.

The significance of the present invention is illustrated by the fact that conventional ultraviolet absorbers alone are not effective in stabilizing pigmented rigid poly(vinyl chloride) better than the pigment, titanium dioxide, alone. Moreover, in some instances, they actually may accelerate degradation. Therefore, the discovery of the synergistic combination of the amides and titanium dioxide as light stabilizers for polymeric compositions is most surprising and very useful.

The pigment polymers ordinarily encountered and to which the present invention especially applies, include vinyl chloride polymers such as poly(vinyl chloride); styrene polymers such as polystyrene; and polyolefins such as polyethylene and polypropylene. Other polymers in which the amides are soluble to the extent that they become effective, may also be used in this invention.

The polymeric compositions to be stabilized by the amides of the present invention should contain at least 0.5% of titanium dioxide, which may be the rutile or anatase type, but preferably is the rutile type. The particle size range of the pigment is not particularly critical, but a practical particle size range is from 0.05 to 0.4 micron and preferably between about 0.15 and 0.3 micron. The concentration of titanium dioxide in the polymeric composition may range from 0.5 to 10.0% or more and preferably is above 0.5% based on the weight of the polymer. The concentration of the amides described above may vary from about 0.1 to about 10.0% and preferably is from about 0.25 to about 3.0% based on the weight of the polymer.

Other additives may be employed in preparing the final polymer for the intended application. Among such additives are fillers, antioxidants, antistatic agents, other pigments, dyes, lubricants, etc., and heat stabilizers.

The stabilized pigmented polymeric compositions of this invention have a wide variety of uses. They may be used effectively for various types of articles including molded products such as appliance cabinets, kitchen cabinets, soft drink cases, milk cases, packing frames, building construction materials, window frames, panels, outdoor siding, etc.; they may also be extruded to form films or filaments, the filaments being of use in fibers and fabrics for specialized uses as in bags, sails, etc.

The invention is further illustrated by the examples which follow:

In the following examples, light stability was determined by preparation of polymeric compositions and exposure to natural light and artificial light in test equipment such as the FS-BL Unit (Fluorescent Sunlamp-Blacklight Unit), the Fade-Ometer and the Sunshine Arc Weather-Ometer. The degree of degradation as shown by color formation is expressed by $\Delta YI$ (Yellow Index change). The determination is made with the use of a differential colorimeter (Colormaster). Yellow Factor (YF) calculations were made from the visible spectra of the samples using the following equation:

$$YF = \frac{\%T_{680}\ m\mu - T_{420}\ m\mu}{\%T_{560}\ m\mu\ \text{(initial)}} \times 100$$

wherein the T values are transmissions at the wavelengths indicated. The FS-BL results are reported as the number of hours to reach a change in Yellow Index ($\Delta YI$) of 15 Units. The Fade-Ometer data are reported as $\Delta YF$ after an indicated number of hours of exposure.

EXAMPLE 1

PVC samples were prepared from the following formulation:

| | Parts |
|---|---|
| Poly(vinyl chloride) | 100 |
| TiO₂ | 2 |
| Organo-tin-mercaptide heat stabilizer | 2 |
| Stearic acid | 0.5 |

Pre-blending of 100 gram quantities was accomplished by roll-mixing the above formulation overnight. Samples for exposure were prepared by adding a suitable quantity of additive, where desired, and milling on a two-roll laboratory mill for five minutes at 170° C., followed by compression-molding at 180° C. to give 50-mil plaques. Results obtained with various light stabilizers are given in the tables which follow.

Additives

A = N,N-dimethyl stearamide
B = Lauric diethanolamide
C = N-(2-dodecyl)acrylamide
D = N,N-dimethyl oleamide
E = N,N-bis(2-cyanoethyl)phthalamic acid
F = Stearamide Additive E is not covered by this invention. It is given for purposes of comparison.

TABLE I.—FS-BL EXPOSURE OF TiO₂ PIGMENTED PVC CONTAINING VARIOUS STABILIZERS

| Test No. | Additive | Initial yellow index | Time (hrs.) to $\Delta YI=15$ | Increase (hrs.) in exposure time |
|---|---|---|---|---|
| 1 | None (control) | 2 | 390 | Control |
| 2 | A (1%) | 2 | 850 | 460 |
| 3 | B (1%) | 4 | 950 | 560 |
| 4 | C (1%) | 3 | 740 | 350 |
| 5 | D (1%) | 2 | 810 | 420 |
| 6 | E (1%) | 4 | 540 | 150 |
| 7 | F (1%) | 3 | 770 | 380 |

TABLE II.—WEATHER-OMETER EXPOSURE OF TiO PIGMENTED PVC CONTAINING VARIOUS STABILIZERS

| Additive | Initial yellow index | $\Delta YI$ at — 200 hours | $\Delta YI$ at — 500 hours |
|---|---|---|---|
| None (control) | 0 | 6 | 22 |
| A (1%) | 1 | 1 | 11 |
| A (2%) | 1 | 0 | 6 |

The FS-BL results show that the amides used in the present invention in combination with titanium dioxide, as compared to the control, significantly increase the number of hours of exposure before a change of Yellow Index of 15 Units occurs. In many cases, the number of hours is double. It is also shown that aromatic amides are much less effective for the same purpose.

The Weather-Ometer results show that the amides used in the present invention with titanium dioxide reduce the change in Yellow Index for a given exposure as compared to the control having titanium dioxide alone.

EXAMPLE 2

Samples prepared according to the procedure described in Example 1 were exposed six months in Arizona at a 45° angle facing South. Results indicating the extent of stabilization achieved with different additives appear in the following table.

TABLE III

| Additive (conc.) | Initial yellow index | $\Delta YI$ Arizona, six months |
|---|---|---|
| None | 0 | 6 |
| A (1%) | 1 | 4 |
| A (2%) | 1 | 2 |
| G (0.5%)[1] | 1 | 7 |
| H (0.5%)[2] | 1 | 10 |

[1] G = 2-(2-hydroxy-5-methylphenyl)benzotriazole.
[2] H = 2-hydroxy-4-methoxybenzophenone.

EXAMPLE 3

Polystyrene samples were prepared from the following formulation:

| | Parts |
|---|---|
| Polystyrene | 100 |
| TiO₂ | 2 |

Both the TiO₂ and additives were blended into the fused polymer on a two-roll laboratory mill at about 160° C. for three minutes. Samples were compression-molded into 50 mil plaques. Results obtained with various light stabilizers are given in the table which follows.

TABLE IV.—FADE-OMETER EXPOSURE OF PIGMENTED POLYSTYRENE

| Test No. | Additive | Initial yellow factor | ΔYF Fade-Ometer 200 hours | ΔYF Fade-Ometer 500 hours |
|---|---|---|---|---|
| 1 | None | 9 | 10 | 54 |
| 2 | A (0.25%) | 10 | 8 | 40 |
| 3 | A (1.0%) | 8 | 4 | 37 |
| 4 | A (2.0%) | 8 | 3 | 27 |
| 5 | D (0.25%) | 12 | 6 | 34 |
| 6 | F (0.25%) | 10 | 10 | 28 |
| 7 | H (0.50%) | 15 | 15 | 39 |

The results show that the amides of the present invention in combination with titanium dioxide reduce the change in Yellow Factor to a greater degree than does titanium dioxide alone, and effectiveness of the amides increases with concentration.

I claim:
1. A pigmented polymeric composition stabilized against the deteriorating effects of light consisting essentially of:
   (1) a polymer selected from the class consisting of poly(vinyl chloride), polystyrene and polyolefins having 2–4 carbons and
   (2) at least 0.5% of titanium dioxide based on the weight of the polymer and
   (3) an amide of the formula:

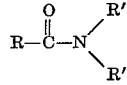

wherein R is alkyl ($C_1$–$C_{18}$), alkenyl ($C_2$–$C_{18}$), carboxyalkyl ($C_1$–$C_{18}$), carb(lower alkoxy) alkyl wherein the alkyl moiety has from 1–18 carbons $(R')_2N$—$(CH_2)_n$, $(R')_2NCO(CH_2)_n$, or $R'CON(R')CH_2$—$(CH_2)_n$; $R'$ is hydrogen, alkyl ($C_1$–$C_{18}$), hydroxy(lower alkyl), lower alkoxy(lower alkyl) or cyano (lower alkyl); and $n$ is zero to eighteen inclusive, said amide being present in a concentration of 0.1–10.0% of the weight of the polymer, said titanium dioxide and said amide together being the sole compounds in said composition capable of imparting light stability to said polymer.

2. The composition of claim 1 wherein the amide is N,N-dimethylstearamide.

3. The composition of claim 1 wherein the amide is N,N-bis(hydroxyethyl)lauramide.

4. The composition of claim 1 wherein the polymer is poly(vinyl chloride).

5. The composition of claim 1 wherein the amide is N-(2-dodecyl)acrylamide.

6. The composition of claim 1 wherein the amide is stearamide.

7. The composition of claim 1 wherein R is a member selected from the group consisting of alkyl ($C_1$–$C_{18}$), carboxyalkyl ($C_1$–$C_{18}$), carb(lower alkoxy)alkyl wherein the alkyl moiety has from 1–18 carbons, $(R')_2N$—$(CH_2)_n$, $(R')_2NCO(CH_2)_n$, and $R'CON(R')CH_2$—$(CH_2)_n$.

8. The composition of claim 1 wherein the polymer is a rigid polymer.

References Cited
UNITED STATES PATENTS

| 2,489,226 | 11/1949 | Morris et al. | 260—41 B |
| 3,104,232 | 9/1963 | Clark et al. | 260—45.9 X |
| 2,985,617 | 5/1961 | Salyer et al. | 260—45.7 |
| 3,509,092 | 4/1970 | Di Giaimo | 260—45.8 |

FOREIGN PATENTS

| 1,000,178 | 8/1965 | Great Britain | 260—41 B |
| 1,223,545 | 10/1964 | Germany | 260—45.9 |

DONALD E. CZAJA, Primary Examiner

M. J. WELSH, Assistant Examiner

U.S. Cl. X.R.
260—45.85, 45.9 R